UNITED STATES PATENT OFFICE.

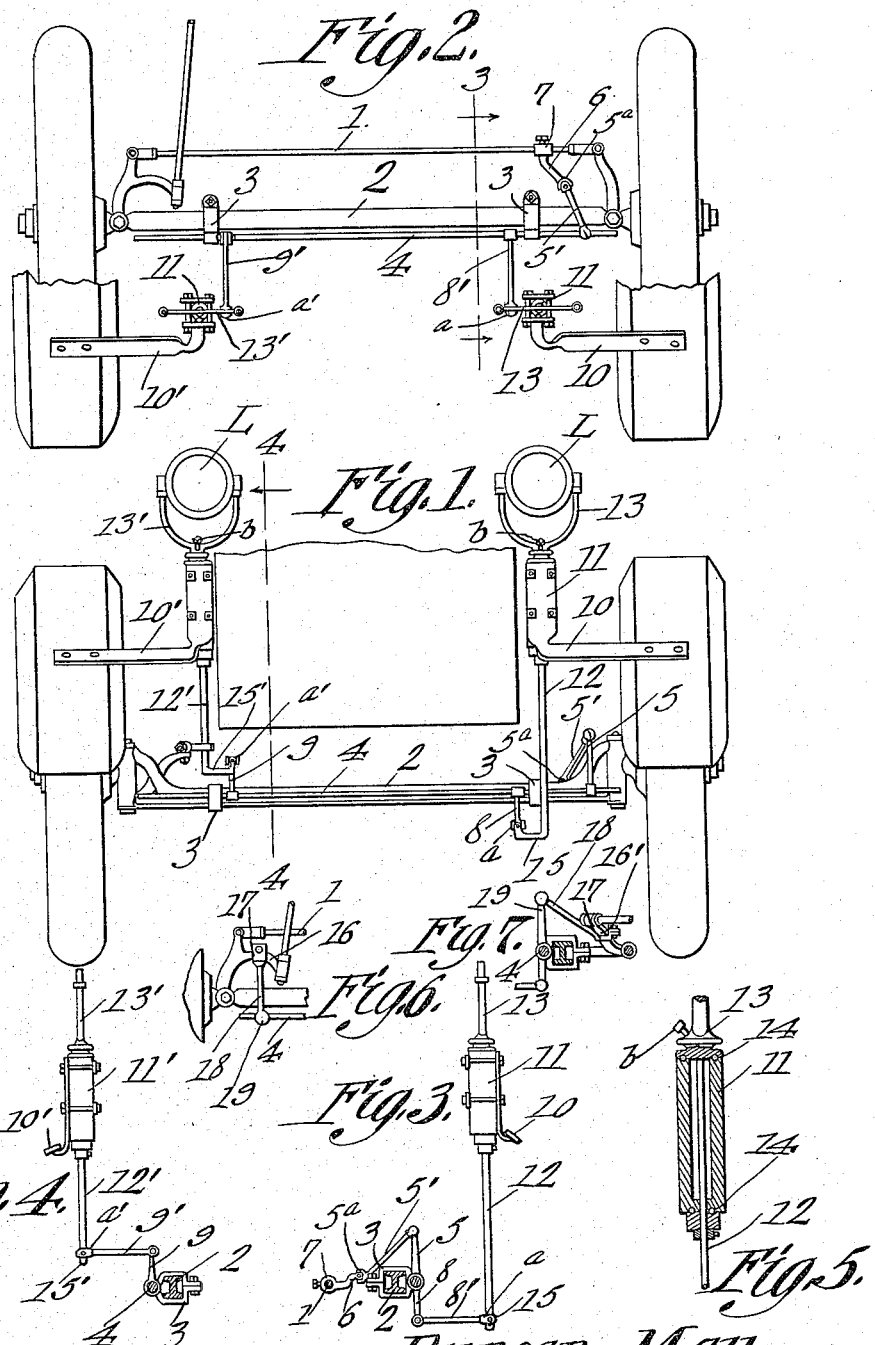

DUNCAN MAY, OF BARNESBORO, PENNSYLVANIA.

DIRIGIBLE LAMP-SUPPORT FOR AUTOMOBILES.

1,165,526.  Specification of Letters Patent.  Patented Dec. 28, 1915.

Application filed December 8, 1914. Serial No. 876,139.

*To all whom it may concern:*

Be it known that I, DUNCAN MAY, a citizen of the United States, residing at Barnesboro in the county of Cambria and State of Pennsylvania, have invented a new and useful Dirigible Lamp-Support for Automobiles, of which the following is a specification.

The present invention relates to improvements in a dirigible lamp support for automobiles, one object of the invention, being the provision of a lamp support, which is readily attached to automobiles and which is operably connected to the steering gear thereof, so that the lamps will be turned in unison in the direction of the steering of the wheels, so that the projected rays therefrom will be in the proper forward direction at all times.

A further object of the present invention, is the provision of a simple and inexpensive device of this character, which is readily applied to the automobiles of the present day, by being connected to the front portion thereof and to the radius rod of the steering gear.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a front elevation of the complete lamp support with portions of the automobile shown. Fig. 2 is a top plan view thereof. Fig. 3 is a section taken on line 3—3 of Fig. 2. Fig. 4 is a section taken on line 4—4 of Fig. 1. Fig. 5 is a detail sectional view through the supporting sleeve of one of the lamp carrying members. Figs. 6 and 7 illustrate another method of connecting the device for operation from another portion of the steering gear.

Referring to the drawings, the numeral 1 designates the radius rod of the steering gear, and 2 the front axle of an automobile. Adjustably and removably attachable to the axle are the two coupling or supporting members 3, which carry and support the rock shaft 4 in front of the axle 2.

The rock shaft 4 is provided with an upstanding arm 5 which is connected through an oblique link 5′ and a flexible or universal joint 5ª to the arm 6, which is adjustably connected at 7 to the radius rod 1. By this means, as the radius rod of the steering mechanisms is moved to change its relative position to the axle 2, the shaft 4 is rocked or oscillated. Connected to and adapted to rock with the shaft 4 are the two arms 8 and 9, the purpose of which will presently appear.

Two brackets 10 and 10′ are employed to properly support the journaling sleeves 11 and 11′ in which are properly supported for oscillation, the vertical rods 12 and 12′, which in turn carry at their upper ends, the lamp carrying brackets or members 13 and 13′ for supporting the lamps L. As illustrated in Fig. 5, the sleeve 11 is provided with the anti-frictional ball bearings 14, so that the respective shafts 12 and 12′ will be anti-frictionally supported and thus will permit of the proper oscillation or movement of the lamp, with the least possible friction.

Carried upon the lower end of each of the respective rods 12 and 12′ is the hooked terminal 15 or 15′ which in turn is connected, as illustrated to the respective link 8′ or 9′. These links 8′ and 9′ are connected to the arms 8 and 9, respectively, so that when the shaft 4 is oscillated, the rods 12 and 12′ will be oscillated in the same direction so that the lamps will direct their rays in the same direction and be maintained in parallel at all times.

Although the brackets or supports 10 and 10′ are shown connected to the mud guard of the automobile, it is apparent that the same may be supported from any desired part of the machine as may be found most desirable, the same merely being indicative of any form of support for the respective sleeves 11 and 11′ so that the lamp carrying rods 12 and 12′ may be supported in the proper or desired position relatively to the radiator and forward portion of the automobile. To prevent unevenness of the roads from imparting undue movement to the lamp carrying rods 12—12′, the universal joints *a—a′*, are employed.

As shown in Figs. 6 and 7, a clamp 17 is connected to the arm or hook 16, carried by the radius rod connecting arm at one side. To this clamp is attached the rod 18, which takes the place of the rods 5′ and 6, and is connected by a universal joint to the rocking arm 19, attached to for rocking the shaft 4. A set screw $b$ is employed to secure the lamp brackets at the desired adjustment.

The present device though shown as used with an automobile, may be used upon other vehicles, trolley cars and locomotives.

What is claimed is:

The combination with an automobile front axle and steering rod, of clamps attached to the axle, a rock shaft journaled in said clamps and having three arms, an adjustable member upon said rod, an oblique link connecting said member and one of said arms, a pair of sleeves, a pair of lamp carrying rods journaled in said sleeves and having lower hooked terminals, and links connecting said hooked terminals and the other arms of the rock shaft.

In testimony that I claim the foregoing as my own, I have hereto affixed my signature in the presence of two witnesses.

DUNCAN MAY.

Witnesses:
WILLIAM H. YOUNG,
WILLIAM F. COY.

Copies of this patent may be obtained for five cents each, by addressing the "Commissioner of Patents Washington, D. C."